United States Patent
Assler et al.

(10) Patent No.: US 7,100,871 B2
(45) Date of Patent: Sep. 5, 2006

(54) LIGHTWEIGHT STRUCTURAL COMPONENT MADE OF METALLIC PLY MATERIALS

(75) Inventors: Herwig Assler, Jork (DE); Hans-Juergen Schmidt, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 132 days.

(21) Appl. No.: 10/646,345

(22) Filed: Aug. 22, 2003

(65) Prior Publication Data

US 2004/0075023 A1 Apr. 22, 2004

(30) Foreign Application Priority Data

Aug. 22, 2002 (DE) ................. 102 38 460

(51) Int. Cl.
*B64C 1/00* (2006.01)
(52) U.S. Cl. .................................. 244/117 R
(58) Field of Classification Search ............ 244/117 R, 244/119, 120, 132; 428/116
See application file for complete search history.

(56) References Cited

U.S. PATENT DOCUMENTS

| | | | |
|---|---|---|---|
| 1,775,386 A * | 9/1930 | Blondin .................. 244/123.4 |
| 3,058,704 A * | 10/1962 | Bergstedt .................... 244/119 |
| 3,401,025 A * | 9/1968 | Whitney ..................... 428/116 |
| 4,052,523 A * | 10/1977 | Rhodes et al. .............. 428/116 |
| 4,411,380 A | 10/1983 | McWithey et al. |
| 4,500,589 A | 2/1985 | Schijve et al. |
| 5,106,668 A * | 4/1992 | Turner et al. ............... 428/116 |
| 5,106,688 A * | 4/1992 | Bradfute et al. |
| 5,151,311 A | 9/1992 | Parente et al. |
| 5,352,529 A * | 10/1994 | Scanlon et al. |
| 5,429,326 A | 7/1995 | Garesché et al. |
| 5,667,866 A * | 9/1997 | Reese, Jr. .................. 428/116 |
| 5,770,287 A * | 6/1998 | Miranda et al. ........... 428/40.1 |
| 5,804,278 A * | 9/1998 | Pike .......................... 428/116 |
| 5,902,756 A * | 5/1999 | Aly et al. |
| 6,114,050 A * | 9/2000 | Westre et al. |
| 6,119,742 A * | 9/2000 | Maeng |
| 6,440,521 B1 * | 8/2002 | Moore ......................... 428/73 |
| 6,695,527 B1 * | 2/2004 | Seaux et al. ................. 404/34 |
| 2005/0112347 A1 | 5/2005 | Schmidt et al. |
| 2005/0112348 A1 * | 5/2005 | Schmidt et al. |

FOREIGN PATENT DOCUMENTS

| | | |
|---|---|---|
| EP | 0 783 960 | 7/1997 |
| EP | 0 649 373 | 9/1997 |
| WO | WO92/15453 | 9/1992 |
| WO | WO98/53989 | 12/1998 |

* cited by examiner

*Primary Examiner*—Michael J Carone
*Assistant Examiner*—John A Radi
(74) *Attorney, Agent, or Firm*—W. F. Fasse; W. G. Fasse

(57) ABSTRACT

A lightweight, laminated structural component, such as a skin section for an aircraft fuselage, is constructed of at least two sheet metal plies that are adhesively bonded to each other. One ply is an uninterrupted ply. The other ply is a lattice with open fields surrounded by strip shaped lands which fortify load exposed areas of the lamination. The open fields of the lattice make mechanical or chemical pocketing operations unnecessary. By shaping and positioning the strip shaped lands including struts in accordance with load patterns to which an aircraft skin is exposed in use, the skin characteristics can be tailored as required.

15 Claims, 3 Drawing Sheets

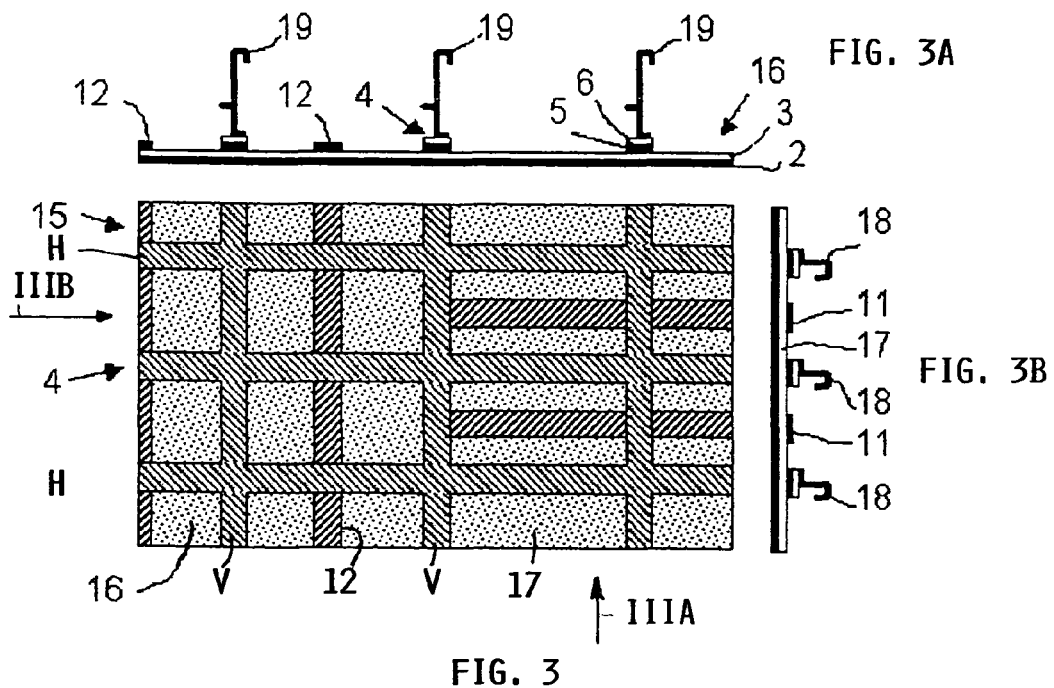
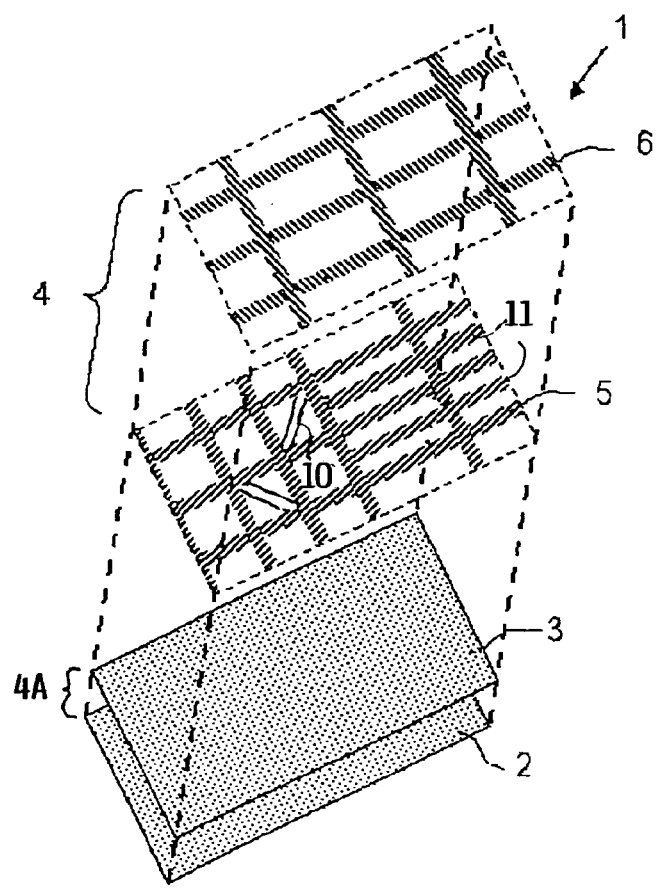

LIGHTWEIGHT STRUCTURAL COMPONENT MADE OF METALLIC PLY MATERIALS

PRIORITY CLAIM

This application is based on and claims the priority under 35 U.S.C. §119 of German Patent Application 102 38 460.6, filed on Aug. 22, 2002, the entire disclosure of which is incorporated herein by reference.

FIELD OF THE INVENTION

The invention relates to lightweight components made of metallic ply materials such as thin sheet metals. At least one metal ply covering the entire area of the component is secured to a further sheet metal ply by adhesive bonding. The invention also relates to a method for producing such lightweight structural components.

BACKGROUND INFORMATION

Conventionally known lightweight structural components comprise an outer skin which is reinforced on an inwardly facing side by a stiffening or stiffening members. For example, conventional aircraft fuselages are constructed in such a way that the outer skin is reinforced or stiffened with the aid of ribs and stringers including so-called "clip". The stiffening members are secured to the inside of the outer skin by rivets, by adhesive bonding, or by welding. In order to adapt the skin thickness to localized load requirements, the skin thickness is reduced in areas where lower loads are effective to thereby reduce the weight of the skin particularly between the stiffening members. Thinning of the skin is performed by mechanical or chemical milling operations. These operations are known as "pocketing".

European Patent Publication EP 0,649,373 B1 corresponding to U.S. Pat. No. 5,429,326 discloses a compound plate comprising at least a first and a second metal ply which are connected to each other by an adhesive layer. Such metal polymer laminates are particularly suitable for use as lightweight structural components in the aircraft construction because these laminates combine advantageous mechanical characteristics with a low structural weight. Due to the limited width of the sheet metals or metal foils to be connected with each other it is necessary to employ a splicing operation for the production of skin sections or fields for an aircraft fuselage. This reference describes the splicing operation. A local adaptation of the laminate thickness of the structural component to different load requirements in different locations is not addressed in this reference.

International Publication WO 98/53989 A1 describes a further lightweight structural component with adhesively bonded metal layers or plies. Compared to the disclosure of U.S. Pat. No. 5,429,326 the International Publication discloses an improvement of the known splicing concept for bonding individual laminated composite panels to a structural component. Again, no local adaptation of the laminate thickness to different load requirements in different locations within the panel area are disclosed.

OBJECTS OF THE INVENTION

In view of the foregoing it is the aim of the invention to achieve the following objects singly or in combination:

- to provide a lightweight laminated structural component that has different weight characteristics in different localized areas in accordance with load requirements that must be met by these localized areas;
- to vary the thickness of such laminate materials so that these materials have a thickness that is larger in high load areas than in lower load areas while simultaneously avoiding any kind of milling operations;
- to improve the tolerance characteristics of such laminated materials against damages, by limiting the progression of cracks and maintaining a certain minimal material strength after damage has occurred; and
- to provide a method for producing such laminate structural components having different strength characteristics in different locations of the laminate material without the need for any pocketing operations.

SUMMARY OF THE INVENTION

According to the invention there is provided a lightweight structural component made of thin metal plies including at least one first metal ply that is uninterrupted throughout its area and at least one second metal ply that is constructed as a framework forming a lattice or lattice structure and an adhesive bond between the first sheet metal ply and the second lattice sheet metal ply.

The use of at least one lattice sheet metal ply bonded to at least one uninterrupted sheet metal ply has the advantage that the lattice structure stiffens the structural component exactly where needed. The stiffening is capable of taking up a portion of the load. The load distribution can be controlled by the configuration of the lattice structure, thereby taking up some of the load that is conventionally taken up by the frame structure of an aircraft. A localized skin reduction by a pocketing between the stiffening members of the fuselage frame is no longer necessary because the respective weight reduction is inherent in the use of a lattice structure as part of the laminated structure. The lattice structure provides a skin thickness reduction throughout the entire area of the particular skin section between the lands and struts of the lattice structure. Moreover, the construction of the lattice structure is easily adapted to the load requirements throughout the aircraft body skin. Another advantage of the invention is seen in that, compared to conventional stiffening features, there are no restrictions regarding the geometry and configuration of the lattice structure. Thus, the stiffening or rather strengthening can be achieved in any desired direction lengthwise or circumferentially of the aircraft body frame and at any desired location of the entire fuselage, thereby tailoring the aircraft skin characteristics to the localized load requirements of the aircraft fuselage. The lattice work permits a differential bonding between the lattice and the uninterrupted ply or plies of the laminated structural component, whereby a crack stop effect is achieved. For example, a crack in the uninterrupted ply will be stopped if it spreads perpendicularly to the lattice ply when the crack enters the area where the lattice ply is bonded to the uninterrupted ply. The lattice ply, so to speak, impedes the progression or spreading of cracks, thereby stopping such cracks from growing.

According to the invention there is further provided a production method for making the present lightweight structural components. The present method comprises the following steps: preparing an uninterrupted sheet metal ply, preparing a lattice sheet metal ply, and adhesively bonding the two plies to each other.

Preferably, the adhesive bonding material is applied to the lattice and then the lattice is pressed against the uninterrupted sheet metal ply.

BRIEF DESCRIPTION OF THE DRAWINGS

In order that the invention may be clearly understood, it will now be described in detail in connection with example embodiments thereof, with reference to the accompanying drawings, wherein:

FIG. 3 is a view similar to that of FIG. 2, however showing two lattice plies superimposed on each other and to form a lattice structure attached to at least one sheet metal ply;

FIG. 3A is a view in the direction of an arrow IIIA in FIG. 3 after reinforcing or stiffening ribs have been attached to the lattice structure;

FIG. 3B is a view in the direction of an arrow IIIB in FIG. 3 after attachment of reinforcing or stiffening stringers;

FIG. 4 shows an exploded view of the lamination structure of FIG. 3 prior to the attachment of reinforcing ribs and stringers.

DETAILED DESCRIPTION OF A PREFERRED EXAMPLE EMBODIMENT AND OF THE BEST MODE OF THE INVENTION

Figure 1:
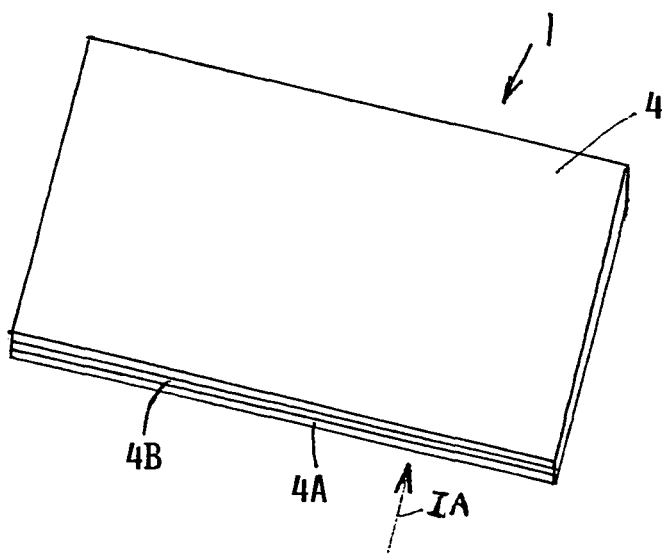
FIG. 1 shows a perspective view of a lightweight laminated structural component such as an aircraft body skin panel according to the invention.

FIG. 1 shows a perspective view of a laminated lightweight structural panel 1 that comprises a lattice ply structure 4 and an uninterrupted ply structure 4A of sheet metal bonded together by an adhesive bonding layer 4B. The panel 1 is suitable for use as a skin section for an aircraft structural component such as a fuselage section. The design process of aircraft structural components requires that a multitude of different design criteria must be taken into account such as deformability, dimensional stability, static material strength, general stability, proneness to crack formations, crack progression, remaining material strength after the formation of cracks, corrosion resistance, and so forth. Further, it is very important the structural component satisfies optimal weight reduction criteria. It has been found that metal laminates which have improved mechanical characteristics as compared to plane sheet metals while being simultaneously lighter, are advantageously useable as skin components of an aircraft fuselage.

Figure 1A:
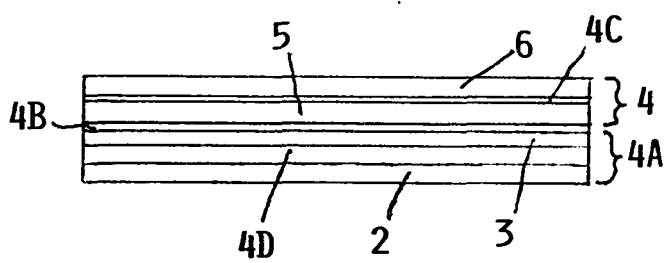
FIG. 1A is an enlarged view in the direction of the arrow IA in FIG. 1.

Referring to FIG. 1A the sectional view illustrates that in this particular embodiment the lattice structure 4 comprises two lattice plies 5 and 6 bonded to each other by an adhesive bonding layer 4C and that the metal ply structure 4A comprises two, uninterrupted sheet metal plies 2 and 3 bonded to each other by an adhesive layer or ply 4D. The metal ply structure 4A and the lattice structure 4 are in turn bonded to each other by the adhesive bonding layer 4B.

The thin uninterrupted metal plies 2 and 3 may be produced as thin sheet metals of the following metal materials such as aluminum alloys, titanium alloys, steel alloys, copper alloys, zinc alloys, and magnesium alloys. The uninterrupted metal plies 2 and 3 each have a thickness of less than 2 mm, preferably a thickness within the range of 0.5 mm to 1.5 mm. This applies also to the lattice plies 5 and 6. However, if only one uninterrupted sheet metal ply 2' is used the thickness of that single uninterrupted sheet metal may be up to 5.0 mm.

The lamination structure makes it possible to select that metal alloy which is most suitable for the outer skin of an aircraft fuselage, depending on the individual or local load requirements set by an aircraft purchaser. For example, a corrosion resistant metal layer may form the outer skin ply of the laminated structure while simultaneously using in the core of the structure primarily lattice ply materials that make the core especially light and stiff while simultaneously having the required material strength and tolerance against damages. The lattice ply or plies form the pocketing, thus avoiding conventional milling operations. Alloys having these characteristics are well known. Further, the respective individual ply thicknesses may be selected in accordance with the individual requirements so that an optimal tailoring of the skin characteristics of an aircraft fuselage becomes possible.

In the example embodiment of FIGS. 1 and 1A the present laminated structural component or panel 1 comprises in addition to the uninterrupted first and second metal plies 2 and 3 at least one lattice ply 5, preferably two lattice plies 5 and 6 as will be described in more detail below. The lattice structure 4 formed by the two lattice plies 5 and 6 is bonded to the inner metal ply 3 by an adhesive bonding layer 4B. The lattice plies 5 and 6 each have a thickness as outlined above. The just described laminated panel 1 is stiffened when it is applied to the stringers and ribs of an aircraft fuselage as will be described below with reference to FIG. 3.

Figure 2:
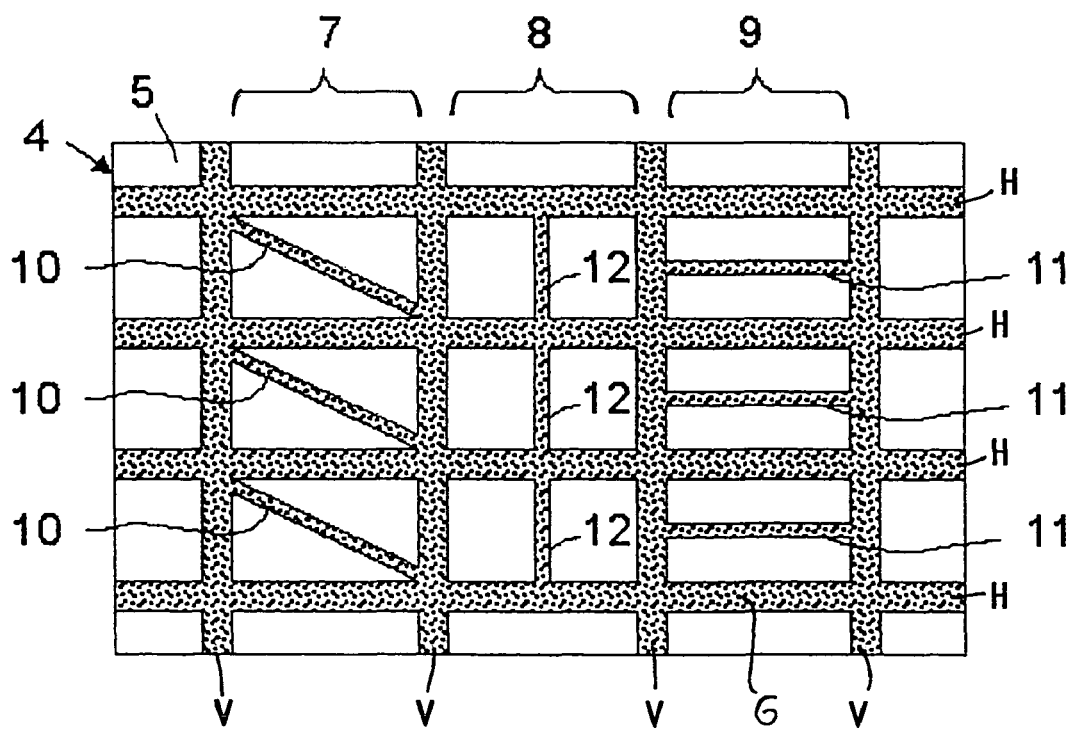
FIG. 2 is a plan view of a lattice structure comprising a single lattice ply according to the invention.

FIG. 2 shows, for example, the lattice ply 5 formed of horizontal lattice elements H and vertical lattice elements V. The horizontal and vertical lattice elements H and V enclose open fields or pockets 7, 8 and 9. In the finished lamination of the panel 1 the fields 7, 8 and 9 form the reduced thickness pockets, whereby any mechanical milling or chemical milling is avoided according to the invention. Reinforcing struts 10, 11 and 12 are positioned individually where reinforcement or stiffening is desired. For example, struts 10 run diagonally from corner to corner in the fields or pockets 7 while reinforcing struts 11 run in parallel to the horizontal elements H in the fields 9. Reinforcing struts 12 run in parallel to the vertical lattice elements V in the fields 8.

FIGS. 3, 3A and 3B show a laminated lightweight fuselage component 15 for an aircraft body according to the invention. A body skin 16 is formed preferably by two lightweight sheet metal plies including the first ply 2 and the second ply 3 bonded to each other at 4D. The lattice structure 4 comprising two sheet metal lattice plies 5 and 6, for example, is formed by adhesively bonding the two lattice plies 5 and 6 to each other. For this purpose, the strip shaped lands of the lattice ply 6 must at least partly coincide or register with the lands of the lattice ply 5. Stiffening members 19 in the form of ribs are adhesively bonded to vertical lands V. Further stiffening members in the form of stringers 18 are secured to horizontal lands H. However, the stiffening members 18 and 19 may also be secured by riveting or welding rather than by adhesive bonding. The lattice structure 4 is at least partly present under the stiffening elements 18 and 19. However, additional lands referred to as struts and functioning as stiffening members may be provided in the open skin fields 17 such as the struts 11 extending in parallel to the horizontal lands H and the struts 12 extending in parallel to the vertical lands V. The sheet metal lattice ply 5 comprises for this purpose a lattice structure that is positioned on the stiffening members 18 and 19 forming stringers and ribs. Directly above the ply 5 with its framework struts 11 and 12 there is arranged the sheet metal lattice ply 6. The lattice ply 6 is directly connected to, or rather the lands of the lattice ply 6 are directly positioned under, the stringers 18 and ribs 19. The thus formed lattice 4 takes up a portion of the load that conventionally was taken up by the stringers 18 and ribs 19 of the conventional aircraft frame structure. Thus, the stiffening elements 18 and 19 can now be made smaller, whereby an additional weight reduction has been achieved.

The lattice 4 is connected with the metal plies 2 and 3 by an adhesive bonding. Conventional metal adhesives, such as reaction adhesives, are used for the present purposes. Such adhesives are cured by a chemical reaction. Epoxy films manufactured by CYTEC Engineering Materials, Inc. under the Tradename FM94 is suitable for the present purposes. Compared to fiber reinforced ply composite material it is a substantial advantage of the invention that the relative expensive fiber layers are no longer required. The adhesive bonding as employed according to the invention does not result in an integral connection between the several plies of sheet metal. However, the invention achieves a crack stop effect, particularly where a crack extends substantially perpendicular to one of the lands of the lattice or perpendicularly to the a lattice strut 10, 11 or 12. In such a case the adhesive bonding ply directly prevents a crack progression in the lattice strut which bridges the crack and thereby either impedes the expansion or directly stops a crack.

Furthermore, an efficient manufacturing is achieved with reduced costs, particularly when the lightweight structural component or panel 1 is produced in a single continuous manufacturing operation, whereby the individual uninterrupted sheet metal ply or plies and the lattice structures with the stringers 18 and ribs 19 are adhesively bonded simultaneously. This efficient and less expensive manufacturing can also be achieved by either securing the stringers and ribs to the lattice structure prior to bonding the lattice structure to the uninterrupted ply or plies or the stringers and ribs 18 and 19 can be secured to the skin structure 16 after the lattice has been bonded to the uninterrupted ply or plies to form the skin structure 16. In both instances the bonding of the plies to each other and the securing of the ribs 19 and the stringers 18 to the lands of the lattice can take place simultaneously. Further, it is possible to connect the stringers 18 to the lattice as described above by adhesive bonding and then to connect the ribs 19 in a following step, for example by conventional methods such as riveting or welding. Similarly, the ribs may be adhesively bonded first to the lattice while the stringers are then riveted to the skin structure 16.

FIG. 4 shows a perspective view of the ply structure of the lightweight structural component or panel 1 shown in FIG. 3. The lattice structure 4 comprises the sheet metal lattice plies 5 and 6 with their strip shaped lands and struts 10, 11, 12 at least in one of the lattice plies 5 or 6. The uninterrupted plies 2 and 3 are bonded to each other and to the lattice structure 4. By selecting the ply thickness for the lattice plies 5, 6 within the range of 0.5 mm to 2.0 mm, by configuring the lattice 4 particularly with regard to the position of the strip shaped lands and struts 10, 11, 12, and by selecting the appropriate metal or metal alloys for the plies 2, 3, 5, 6 it is now possible according to the invention to tailor the lightweight structural component to have optimal characteristics relative to the requirements that must be met by an aircraft fuselage structure 15. The lattice plies 5 and 6 may be both constructed with struts 10, 11, 12 or only one lattice ply 5 or 6 may have such struts. In FIG. 4 the inner lattice ply 5 is provided with struts 10 and 11, for example.

Figure 5:
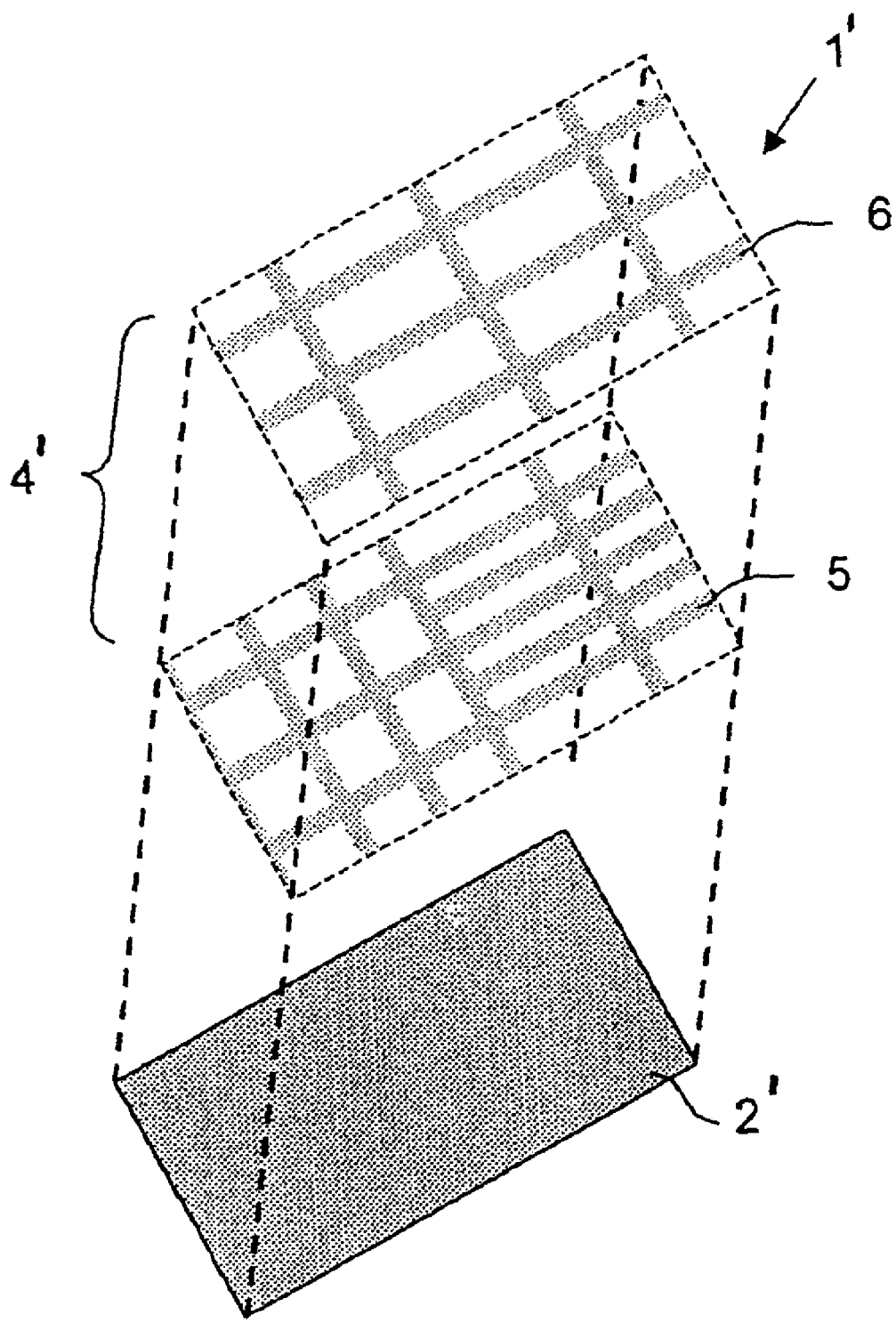
FIG. 5 is an exploded view similar to that of FIG. 4, however showing only one uninterrupted metal ply and two lattice plies.

The structural component 1' made in accordance with FIG. 5 is similar to that of FIG. 4 but has only one uninterrupted sheet metal ply 2'. In this embodiment the thickness of the single uninterrupted sheet metal ply 2' may be thicker than outlined above, for example up to 5.0 mm depending on the load requirements that must be met by the laminated structure that forms the structural component 1'.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lightweight, laminated structural component made of thin metal plies comprising at least one sheet metal component that is uninterrupted throughout its area, at least one further sheet metal component constructed as a framework forming a lattice, a first adhesive bond between said at least one sheet metal component and said lattice, and stiffening members (18, 19) operatively secured at least partly to said lattice for forming a skin of an aircraft fuselage, wherein said stiffening members extend on a radially inward side of said skin facing toward a longitudinal central axis of said aircraft fuselage.

2. The lightweight, laminated structural component of claim 1, wherein said at least one sheet metal component comprises a first sheet metal ply that is uninterrupted throughout its area, a second sheet metal ply that is also uninterrupted throughout its area, and a second adhesive bond between said first and second uninterrupted sheet metal plies to form a first ply structure, and wherein said further sheet metal component comprises a first sheet metal lattice, a second sheet metal lattice, and a third adhesive bond between said first and second sheet metal lattices to form a second ply structure, and wherein said second ply structure is bonded to said first ply structure by said first adhesive bond.

3. The lightweight, laminated structural component of claim 1, wherein said stiffening members comprise stringers (18) extending in parallel to said longitudinal central axis, and ribs (19) extending circumferentially relative to said longitudinal central axis.

4. The lightweight, laminated structural component of claim 1, wherein said lattice comprises sheet metal lands and sheet metal struts (10, 11, 12) as part of said lattice, and wherein said sheet metal struts are positioned between said sheet metal lands for strengthening said lattice in accordance with load dependent criteria.

5. The lightweight, laminated structural component of claim 4, wherein said struts (11, 12) extend in parallel to said stiffening members (18, 19) and/or at an angle relative to said stiffening members.

6. The lightweight, laminated structural component of claim 1, wherein said lattice comprises strip shaped sheet metal lands that are positioned to face into said aircraft fuselage, said strip shaped sheet metal lands forming at least one sheet metal ply with open fields surrounded by said strip shaped sheet metal lands.

7. The lightweight, laminated structural component of claim 1, wherein said at least one sheet metal component and said further sheet metal component forming said lattice have a thickness within the range of 0.5 mm to 5.0 mm.

8. The lightweight, laminated structural component of claim 1, wherein said at least one sheet metal component and said at least one further sheet metal component are made of a metal selected from the group of: alloys of aluminum, alloys of titanium, steel alloys, alloys of copper, alloys of zinc, and alloys of magnesium.

9. A method for manufacturing the lightweight, laminated structural component of claim 1, comprising the following steps:
(a) preparing said at least one sheet metal component forming at least one sheet metal ply that is uninterrupted throughout its area,
(b) preparing said further sheet metal component constructed as said framework forming said lattice having strip shaped sheet metal lands surrounding open fields, and
(c) adhesively bonding said lattice to said at least one sheet metal ply to form said first adhesive bond.

10. The method of claim 9, wherein said adhesive bonding is performed so that at least portions of said lattice are adhesively bonded to said at least one uninterrupted sheet metal ply and wherein said portions are determined by load distribution patterns to which said structural component is exposed.

11. The method of claim 9, wherein said preparing steps and said adhesive bonding step are performed as a continuous, uninterrupted production operation.

12. The method of claim 9, comprising using an epoxy film as a bonding layer forming said first adhesive bond between said lattice and said sheet metal component.

13. The method of claim 9, further comprising preparing at least two uninterrupted sheet metal plies, adhesively bonding said at least two uninterrupted sheet metal plies to each other, preparing at least one lattice, and adhesively bonding said at least one lattice to said at least two uninterrupted sheet metal plies.

14. The method of claim 9, further comprising securing said stiffening members (18, 19) to said strip shaped sheet metal lands by any one or more of the following steps: adhesive bonding, riveting and welding.

15. The method of claim 9, further comprising forming said further sheet metal component with said strip shaped sheet metal lands and with sheet metal struts between said sheet metal lands.

\* \* \* \* \*